(12) United States Patent
Meyer et al.

(10) Patent No.: US 7,167,085 B2
(45) Date of Patent: Jan. 23, 2007

(54) OPTICAL DISPLAY DEVICE FOR A SELECTOR LEVER ARRANGEMENT

(75) Inventors: Jörg Meyer, Wagenfeld (DE); Andreas Giefer, Lemförde (DE); Michael Völz, Drebber (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 10/833,233

(22) Filed: Apr. 27, 2004

(65) Prior Publication Data

US 2004/0201465 A1   Oct. 14, 2004

Related U.S. Application Data

(63) Continuation of application No. PCT/DE03/01727, filed on May 27, 2003.

(30) Foreign Application Priority Data

May 28, 2002   (DE)   ................ 102 23 854

(51) Int. Cl.
*B60Q 1/00* (2006.01)
(52) U.S. Cl. .............. 340/456; 340/461; 200/61.88
(58) Field of Classification Search ............. 340/425.5, 340/456, 461; 200/61.88
See application file for complete search history.

(56) References Cited

U.S. PATENT DOCUMENTS 6,046,673 A * 4/2000 Michael et al. ............ 340/456

6,360,624 B1 * 3/2002 Sedlmaier et al. ............ 74/335

FOREIGN PATENT DOCUMENTS

| DE | 39 29 268 A1 | 3/1991 |
|---|---|---|
| DE | 199 16 924 A1 | 10/2000 |
| EP | 0 106 789 A2 | 4/1984 |
| EP | 0 416 227 A1 | 3/1991 |
| EP | 0 616 153 A2 | 9/1994 |
| EP | 1 134 456 A2 | 9/2001 |
| GB | 2 203 673 | 2/1997 |
| JP | 2001-322444 | 11/2001 |

* cited by examiner

*Primary Examiner*—Julie Bichngoc Lieu
(74) *Attorney, Agent, or Firm*—McGlew & Tuttle, PC

(57) ABSTRACT

An optical display device of a selector lever arrangement with a selector lever mounted in the motor vehicle for shifting between different shifting states of a motor vehicle transmission. The selector lever can be pivoted along at least one shift gate from a first selector lever position into at least one second selector lever position, wherein the optical display device has at least two display elements arranged in different display positions for displaying symbols unambiguously associated with the shifting states and a detection device for detecting the current shifting state. The symbol associated with the current shifting state is always displayed by the first display element during the operation of the display device.

10 Claims, 6 Drawing Sheets

OPTICAL DISPLAY DEVICE FOR A SELECTOR LEVER ARRANGEMENT

CROSS REFERENCE TO RELATED APPLICATION

This is a continuation of and claims the benefit (35 U.S.C. §120 and 365(c)) of copending International Application PCT/DE 03/01727 of May 27, 2003, which designated inter alia the United States and which claims the priority of German Application DE 102 23 854 of May 28, 2002. The entire contents of each application is hereby incorporated by reference in its entirety.

FIELD OF THE INVENTION

The present invention pertains to a process for displaying symbols unambiguously associated with different shifting states of a motor vehicle transmission in at least two different display positions and to an optical display device of a selector lever arrangement arranged in the motor vehicle with a selector lever arrangement mounted in same for shifting between different shifting states of a motor vehicle transmission.

BACKGROUND OF THE INVENTION

DE 199 16 924 A1 discloses an optical display device of a selector lever arrangement with a selector lever mounted in the motor vehicle for shifting between different shifting states of a motor vehicle transmission, which selector lever can be pivoted along a shift gate from a first selector lever position into a second selector lever position. The optical display device has a plurality of display elements, which are arranged at different display positions, for displaying symbols unambiguously associated with the shifting states, a single one of these shifting states being associated with each display position. The current shifting state of the motor vehicle transmission is now optically highlighted, and the location at which this highlighting takes place depends on the location of the display element associated with the shifting state currently selected.

Such an optical display device is not always unambiguous and easy to understand and may therefore lead to irritations or operating errors.

SUMMARY OF THE INVENTION

Based on this state of the art, the basic object of the present invention is to make possible an easy-to-understand display of shifting states of a motor vehicle transmission, so that the risk for irritations or operating errors is reduced.

The process according to the present invention for displaying symbols unambiguously associated with different shifting states of a motor vehicle transmission in at least two different display positions has the following process steps: (a) detection of the current shifting state of the motor vehicle transmission; (b) displaying of the symbol associated with the current shifting state in a first of the two display positions; (c) displaying of the symbol associated with another one of the shifting states in the second display position, and (d) shifting of the motor vehicle transmission from the current shifting state into the other shifting state, and (e) displaying of the symbol associated with the other shifting state in the first display position after the shifting.

According to the process according to the present invention, the shifting state currently being assumed by the motor vehicle transmission is always displayed in the first display position, so that the driver of the vehicle needs to concentrate only on a single display site when the driver would like to check the current shifting state of the motor vehicle transmission. Furthermore, when shifting from the current shifting state into the other shifting state, the other shifting state is displayed by the associated symbol in the second display position. An easy-to-understand and unambiguous display of shifting states is thus created, so that operating errors and irritations can be effectively counteracted.

The symbol associated with the other shifting state is preferably not displayed in the second display position any longer after the shifting. The symbol associated with a selectable shifting state of the shifting states can rather be displayed in the second display position after the shifting, a selectable shifting state being defined as one of the shifting states of the motor vehicle transmission that differs from the shifting state currently being assumed by the motor vehicle transmission.

In particular, it is advantageous for the selectable shifting state, whose associated symbol is displayed in the second display position, to be a shifting state of the shifting states that can be reached with a single shifting operation. The driver of the vehicle thus has a clear picture of the next shifting possibilities.

Since shifting between different shifting states of the motor vehicle transmission is regularly performed several times in a motor vehicle, the process can be performed anew for each shifting by beginning anew with performing the process step (a) after performing the process step (e). After the process step (d), the "other shifting state" becomes in this case the new "current shifting state" of the process step (a) performed repeatedly. The "other shifting state" according to process step (c) can also change when this process step (c) is repeated.

The current selector lever position can be determined from a memory, in which the current shifting state of the transmission is stored. However, the current shifting state is preferably checked directly from the transmission.

The process is especially well suited for a selector lever arrangement whose selector lever can be shifted, starting from a stable selector lever position, into at least one other, unstable selector lever position. The term "unstable" means here that the selector lever automatically returns from an unstable selector lever position into the stable selector lever position, which forms the inoperative position of the selector lever. The first display position of the stable position of the selector lever is therefore preferably associated with a selector lever arrangement arranged in the motor vehicle, whereas the second display position is associated with an unstable position of the selector lever.

Furthermore, an optical display device of a selector lever arrangement with a selector lever mounted in the motor vehicle is provided according to the present invention for shifting between different shifting states of a motor vehicle transmission, which said selector lever can be pivoted along at least one shift gate from a first selector lever position into at least one second selector lever position, wherein the optical display device has at least two display elements arranged in different display positions for displaying symbols unambiguously associated with the shifting states and a detection device for detecting the current shifting state. The symbol associated with the current shifting state is always displayed by the first display element during the operation of the display device.

This display device, which is suitable for carrying out the process according to the present invention, is easy to understand for the driver of the vehicle and unambiguously shows the current shifting state. Irritations and operating errors are thus avoided, because the driver of the vehicle needs to concentrate only on a single display element when he would like to determine the current shifting state of the motor vehicle transmission.

The symbol associated with a selectable shifting state of the shifting states is preferably displayed by the second display element, so that the driver of the vehicle can recognize from the display of the second display element which shifting state can be selected starting from the current shifting state by actuating the gearshift lever. This also makes a considerable contribution to the unambiguity and to the easier understanding of the display device, because not all possible shifting states are displayed simultaneously any longer.

The optical display device is especially suitable for a selector lever that can be pivoted from a stable selector lever position into at least one other, unstable selector lever position, from which the selector lever can automatically return into the stable selector lever position. The first selector lever position is therefore preferably designed as a stable selector lever position and the second selector lever position as an unstable selector lever position.

If many selector lever positions are to be reached by means of the selector lever, it is advantageous for the selector lever to be able to be pivoted into at least one third selector lever position that is not located in the at least one shift gate and that is associated with a third display element arranged in a third display position, which said display element is not located on a straight line with the other two display elements. This variant of the present invention makes it possible, for example, to pivot the selector lever into a second shift gate via a selection gate starting from the at least one shift gate, so that markedly different movements are necessary for reaching the third selector lever position than for reaching the first and second selector lever positions. This also improves the detectability and the understandability for the driver of the vehicle, because not all display elements are now located on a single straight line any longer. This third selector lever position is preferably also an unstable selector lever position, from which the selector lever can automatically return into the stable selector lever position.

The display elements may be arranged either directly at the selector lever arrangement, for example, at the knob of the selector lever, or separately from the selector lever arrangement, e.g., at the center console, in the motor vehicle. In particular, the display elements are arranged on the dashboard, because the driver does not have to look away from the road any longer in this case, as the dashboard is usually closer to the windshield of the motor vehicle than the center console.

If possible, the display elements should be arranged such that they enable the driver of the vehicle to rapidly detect the current shifting state and, furthermore, to rapidly detect the currently selectable shifting states. It proved to be particularly suitable for the display elements to be arranged geometrically similarly to the arrangement of the selector lever positions. The display elements are therefore preferably arranged such that the projection of the selector lever positions onto a plane can be transformed into the display positions by a true straight and parallel imaging rule. The driver of the vehicle thus recognizes in the arrangement of the display elements the selector lever positions that can be selected with the selector lever, so that he does not have to spend time associating the different display elements with the different selector lever positions.

If at least three display elements not located on one straight line are present in this case, the selector lever can be pivoted in at least two different, nonparallel directions. These pivoting directions can be imitated in the optical display device in such a way that the image of the pivoting space of the selector lever generated by means of the imaging rule can be optically highlighted by means of shift gate displays, which extend from the first to the second display position and from the first to the third display position. These shift gate displays may be formed by, e.g., elongated lights, which clearly contrast with the background in which the display elements and the shift gate displays are arranged. The shift gate displays also facilitate the task of the driver of the vehicle, who will now recognize an image of the pivoting space of the selector lever in the optical display device in a very short time.

Furthermore, it is possible, e.g., for the second display element to be part of a first of the shift gate displays and for the third display element to be part of a second of the shift gate displays.

The shift gate displays may be especially advantageously shown optically differently independently from each other, so that only one of the shift gate displays is shown, which leads to a selector lever position with which a selectable and reachable shifting state of the motor vehicle transmission is associated. It is thus possible, e.g., not to show and to optically highlight shift gate displays that lead to a selector lever position that is not associated with a reachable shifting state of the motor vehicle transmission starting from the current shifting state. This also greatly improves clarity, so that the driver of the vehicle needs to concentrate only on shifting states that can be reached.

Each shift gate display element may be an independent display unit cooperating with one or more other display elements as a system or the system may use a single unit with display elements (e.g., the single unit has display portions providing the respective display elements or a single display has display regions providing the display elements).

The term "unambiguous" means in the sense of the present invention that only a single symbol is associated with each shifting state of the transmission, and also only a single shifting state of the transmission is associated with each symbol.

The present invention will be described below on the basis of preferred embodiments with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
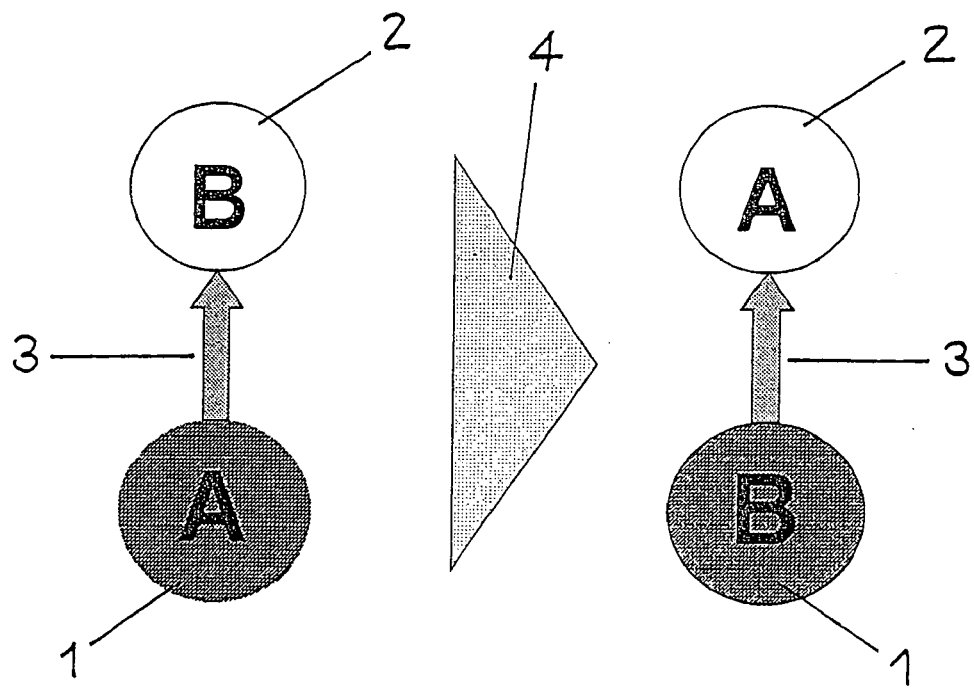
FIG. 1 is a view of an optical display according to a first embodiment of the present invention.

FIG. 1 shows a first embodiment of a display according to the present invention, on the basis of which the process according to the present invention can be illustrated in a simple manner. Reference number 1 designates a first display element or display portion, which is arranged in a first display position and which is associated with a stable position of the selector lever of a selector lever arrangement arranged in the motor vehicle. The first display element 1 displays the symbol "A," which represents a first shifting state of a transmission (not shown), which has two shifting states. A second display element (or second display portion) 2 is arranged at a spaced location from the first display element 1 in a second display position and shows the symbol "B," which is associated with the other, selectable shifting state of the two shifting states of the motor vehicle transmission. The display positions of the two display elements 1 and 2 also represent here the actual positions of the selector lever, the first display position being associated with the stable selector lever position, and the second display position being associated with an unstable selector lever position. The arrow 3 between the two display elements 1 and 2 indicates that the transmission can be shifted from the shifting state A into the shifting state B by moving the selector lever from the stable selector lever position into the unstable selector lever position.

The shifting operation itself is indicated by arrow 4, the state of the display elements 1 and 2 before the shifting being shown to the left of arrow 4 and the state of the display elements 1 and 2 after the shifting being shown to the right of arrow 4. After the shifting, the first display element 1 displays the symbol B for the second shifting state of the transmission, whereas the second display element 2 displays the symbol A for the first shifting state of the transmission. This means that the second shifting state of the transmission symbolized by B is now the shifting state actually being assumed by the transmission, whereas the shifting state represented by the symbol A is the selectable shifting state now. The arrow 3 between the two display elements 1 and 2 indicates here that the transmission can be shifted back from the shifting state B into the shifting state A by moving the selector lever from the stable selector lever position into the unstable selector lever position.

Figure 2:
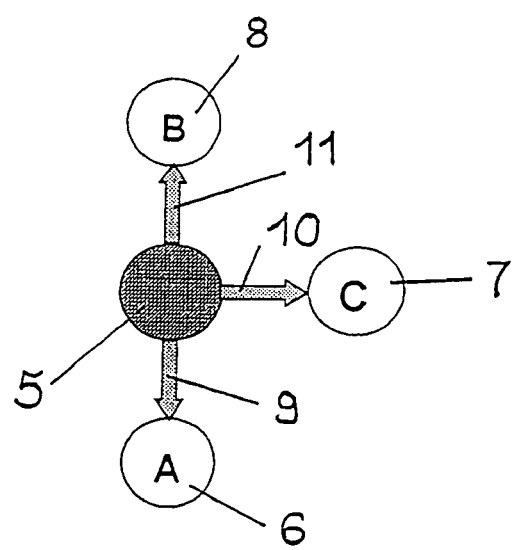
FIG. 2 is a view of selector lever positions of a selector lever arrangement for a display device according to a second embodiment of the present invention.

FIG. 2 shows selector lever positions of a selector lever arrangement for a display device according to a second embodiment of the present invention, wherein the reference number 5 designates the stable position of the selector lever and the reference numbers 6, 7 and 8 designate the unstable positions of the selector lever. Arrows 9, 10 and 11, which designate the direction of pivoting of the selector lever to reach one of the unstable selector lever positions 6, 7 and 8 starting from the stable selector lever position 5, are shown between the selector lever positions 5 and 6, 5 and 7 as well as 5 and 8. As is apparent from the figure, the selector lever position 8 is associated with shifting state B, the selector lever position 7 with shifting state C, and the selector lever position 6 with the shifting state A.

Figure 3:
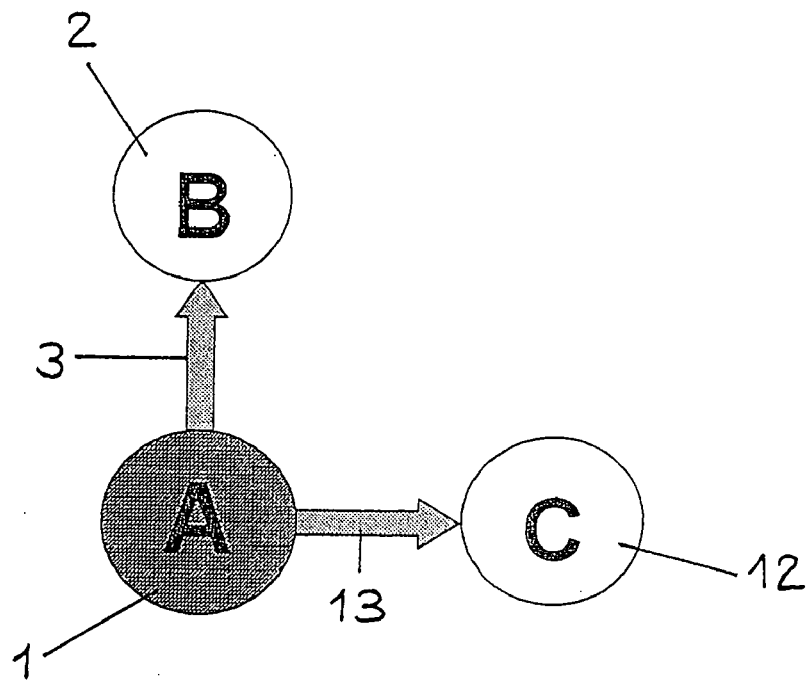
FIG. 3 is a view of the embodiment according to FIG. 2 in shifting state A.

FIG. 3 shows a display device according to the second embodiment for a selector lever arrangement according to FIG. 2, wherein the motor vehicle transmission is shifted into the shifting state designated by A, so that the display element 1 associated with the stable selector lever position displays the symbol A. A display element 12 is provided to display the selector lever position C, and arrow 13 indicates that the shifting state C can be set in the transmission by pivoting the selector lever from the stable selector lever position A into the unstable selector lever position C. As in FIG. 1, the display element 2 is provided for displaying the selector lever position B, and arrow 3 indicates that the shifting state B can be set in the transmission by pivoting the selector lever from the stable selector lever position A into the unstable selector lever position B. A display element 14 (see FIG. 4) for the shifting state A is optically inactive here, because the selection of the shifting state A starting from the current shifting state A would not bring about any change in the state of the transmission.

Figure 4:
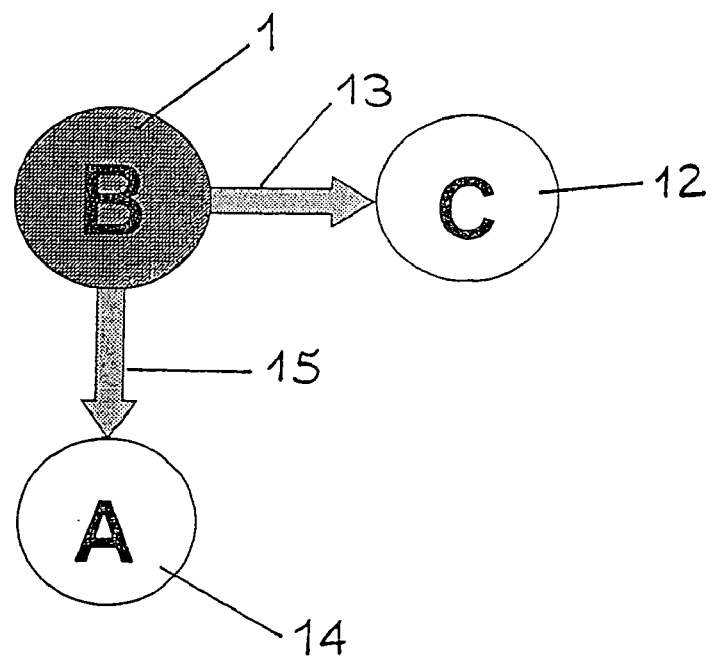
FIG. 4 is a view of the embodiment according to FIG. 2 in shifting state B.

According to FIG. 4, the display device according to the second embodiment is shown for the shifting state designated by B as the current state of the transmission, so that the display element 1 associated with the stable selector lever position displays the symbol B. The display element 14 is provided to display the selector lever position A, and arrow 15 indicates that the shifting state A can be set in the transmission by pivoting the selector lever from the stable selector lever position B into the unstable selector lever position A. As in FIG. 3, the display element 12 is provided to display the selector lever position C, and the arrow 13 indicates that the shifting state C can be set in the transmission by pivoting the selector lever from the stable selector lever position B into the unstable selector lever position C. The display element 2 for the shifting state B is optically inactive here, because the selection of the shifting state B starting from the current shifting state B would not bring about any change in the state of the transmission.

Figure 5:
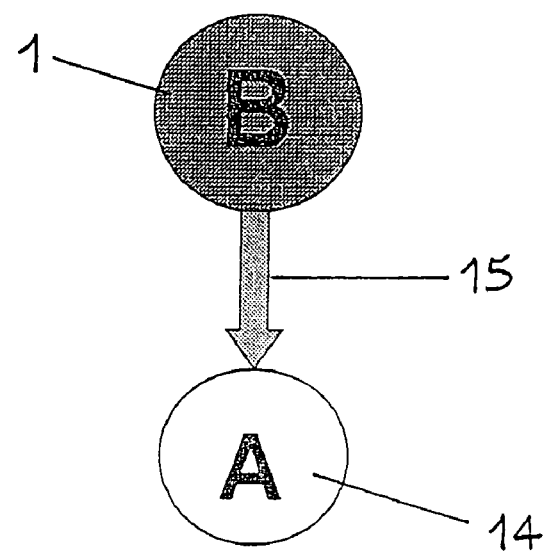
FIG. 5 is a view of the embodiment according to FIG. 2 in a modified shifting state B.

FIG. 5 shows a modified display device according to the second embodiment, because the state C cannot be reached from the current state B according to this modified form. The display element 12 therefore does not display the symbol C.

According to the second embodiment, the arrows 3, 13 and 15 also can or cannot be displayed depending on the particular shifting states that can be selected and reached.

Figure 6:
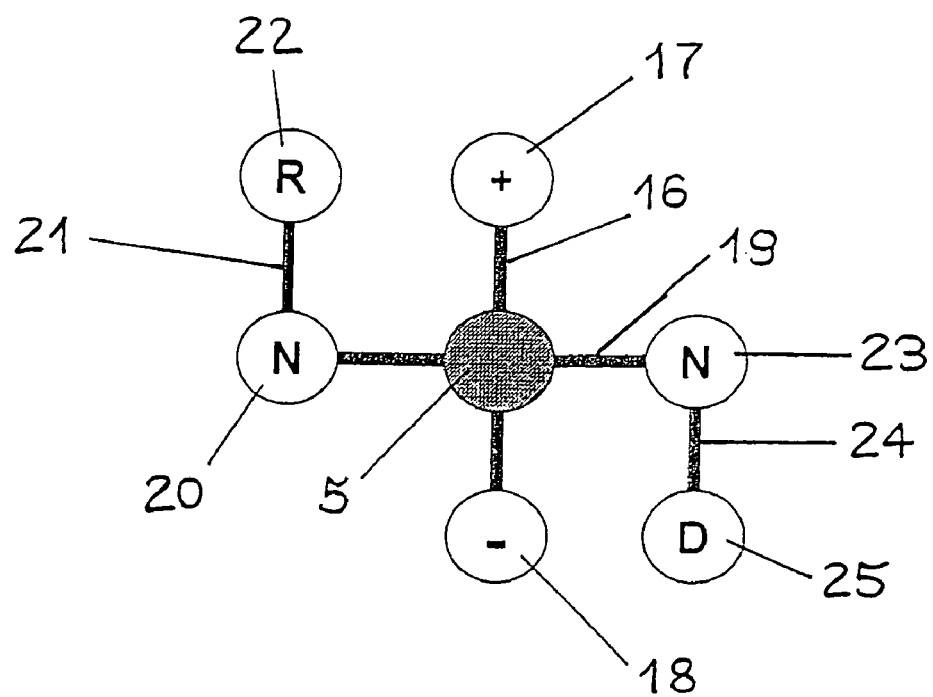
FIG. 6 is a view of selector lever positions of a selector lever arrangement for a display device according to a third embodiment of the present invention.

FIG. 6 shows a schematic diagram in which the position 5 corresponds to a stable position of a selector lever of a selector lever arrangement. Along a shift gate 16, the selector lever can be pivoted in one direction into an unstable position 17 designated by + and in the opposite direction into an unstable position 18 designated by –. Furthermore, the selector lever can be pivoted along a selection gate 19 in one direction into a second shift gate 21 via an unstable selector lever position 20 designated by N, an unstable selector lever position 22 designated by R for engaging the reverse gear being provided at the end of the shift gate facing away from the selector lever position 20. If the selector lever is pivoted along the selection gate 19 in the opposite direction, the selector lever will enter a third shift gate 24 via an unstable selector lever position designated by N, and an unstable selector lever position 25 designated by D, via which the drive state of the transmission can be set, is provided at the end of the shift gate 24 acing away from the selector lever position 23.

Figure 7:
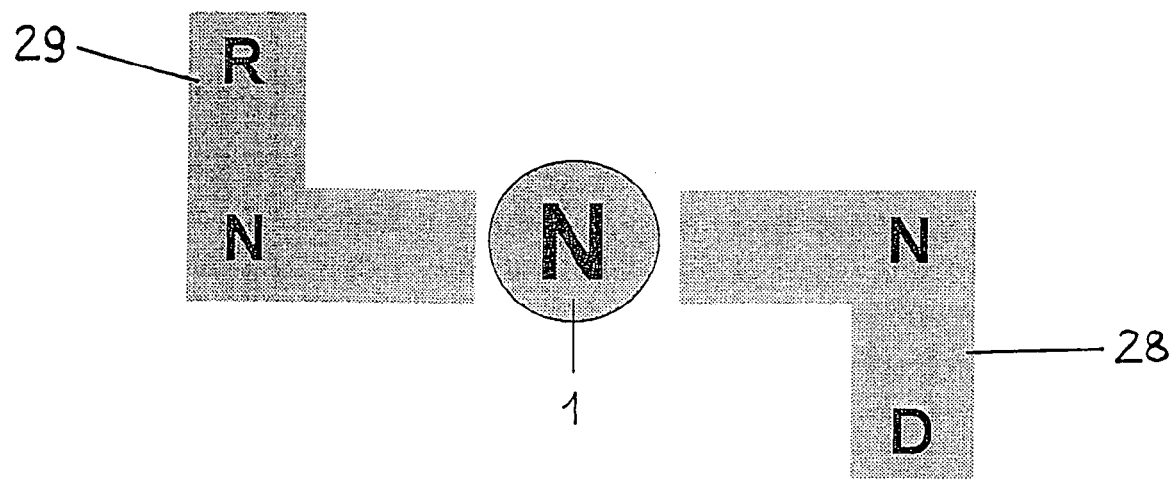
FIG. 7 is a view of the embodiment according to FIG. 6 in shifting state N (neutral)

FIG. 7 shows the display device according to a third embodiment, which is associated with the schematic diagram according to FIG. 6, wherein the display element 1 displays the neutral state of the transmission, which is designated by the symbol N and is associated with the stable selector lever position 8. According to the present invention, the display element 1 always displays the symbol for the shifting state of the motor vehicle transmission that is actually being engaged. The shifting states R and D can be selected starting from the neutral N, and it is made clear in the display device that the driver of the vehicle must first pivot the selector lever along the selection gate 19 via the selector lever positions 20, 23 designated by N into other shift gates 21, 24 in order to reach the selector lever positions 22, 25 associated with the selected shifting states R, D. Consequently, not only the selectable shifting states R and D, but also the shifting paths, along which the gearshift lever must be pivoted in order to reach the respective shifting states R and D, are optically highlighted in this embodiment. The selector lever positions 17 and 18 designated by + and − are used to upshift and downshift the gears when the transmission has assumed the drive state D. Since the selection of the selector lever positions + and − from the neutral state N consequently has no effect, these selector lever positions are not displayed by the display device, either.

Figure 8:
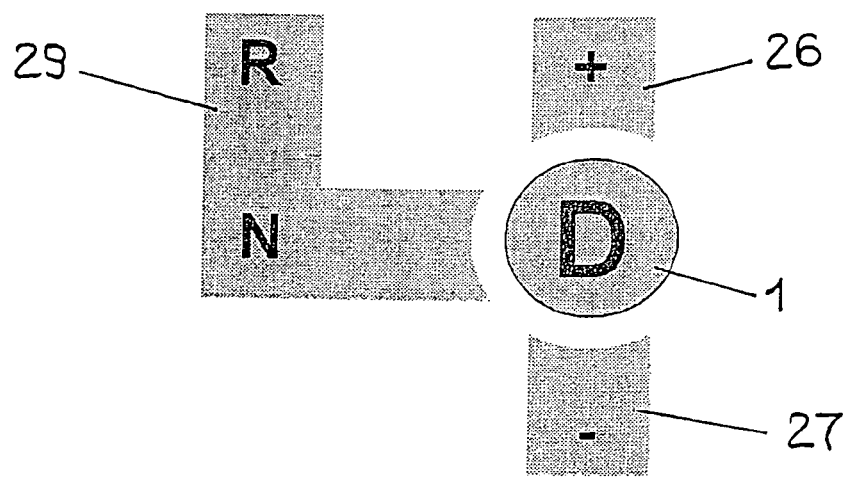
FIG. 8 is a view of the embodiment according to FIG. 6 in shifting state D (drive)

FIG. 8 shows the display device according to the third embodiment in a state in which the motor vehicle transmission has assumed the shifting state designated by D for the drive. The symbol D is correspondingly displayed by the display element 1. Since the selector lever positions designated by + and − van exert an action from this shifting state of the transmission, these selector lever positions are also optically highlighted by display elements 26 and 27. The plus symbol means here that the motor vehicle transmission is upahifted by one gear in the forward drive, and the minus symbol means that the motor vehicle transmission is downahifted by one gear in the forward drive. Since the shifting state D has already been selected, the display element or the shift gate display 28, which is associated with the selector lever position D, does not need to be highlighted optically any longer, unlike in FIG. 7. However, since the shifting states N and R can be selected from the current shilling state D, the display elements or shift gate displays 29 associated with these shift positions are also displayed in an optically highlighted form.

Figure 9:
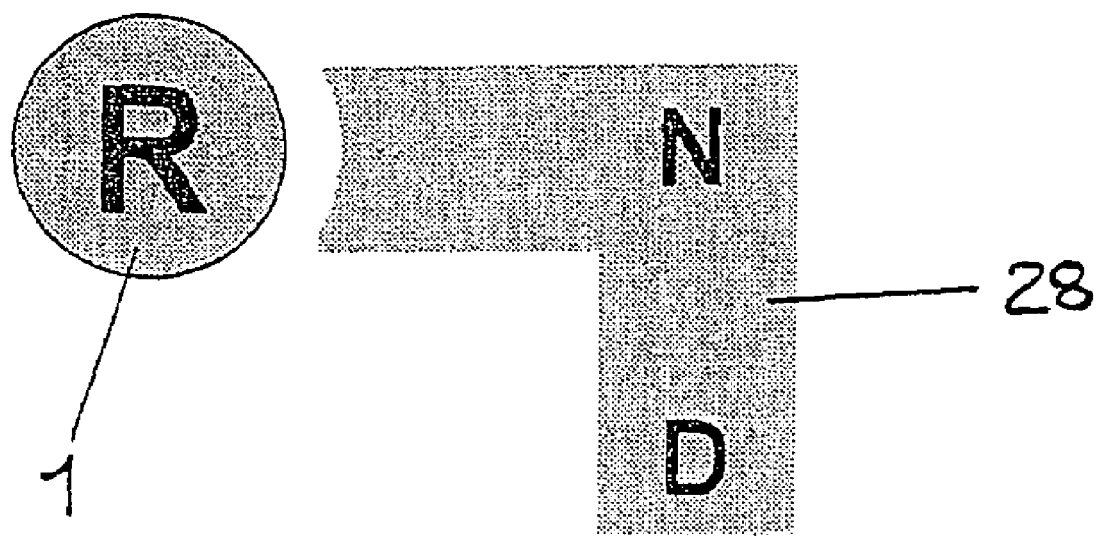
FIG. 9 is a view of the embodiment according to FIG. 6 in shifting state R (reverse)

FIG. 9 shows the display device according to the third embodiment during the reverse drive of the transmission. The R displayed by the display element 1 indicates this mode of operation of the transmission, and only the neutral, designated by N, and the drive, designated by D, can be selected from this state of the transmission. The symbols of the two shifting states are displayed accordingly by the associated display elements or shift gate display 28, whereas the display elements or the shift gate display 29 are not shown, because the shifting state R has already been selected. Since the selection of the selector lever positions 17, 18 designated by + and − from the shifting state R has no effect, these selector lever positions are not optically highlighted by the display elements 26 and 27, either.

According to the third embodiment, shift gate displays 28, 29 are used to display the symbols D, R and N associated with the selectable shifting states, and the shift gate display 28 also shows by symbols at the same time the selector lever position 25, the shift gate 24, the selector lever position 23 and part of the selection gate 19 that extends between the selector lever position 5 and the selector lever position 23. Furthermore, the shift gate display 29 shows by symbols at the same time the selector lever position 22, the shift gate 21, the selector lever position 20 and part of the selection gate 19 that extends between the selector lever position 5 and the selector lever position 20.

Figure 10:
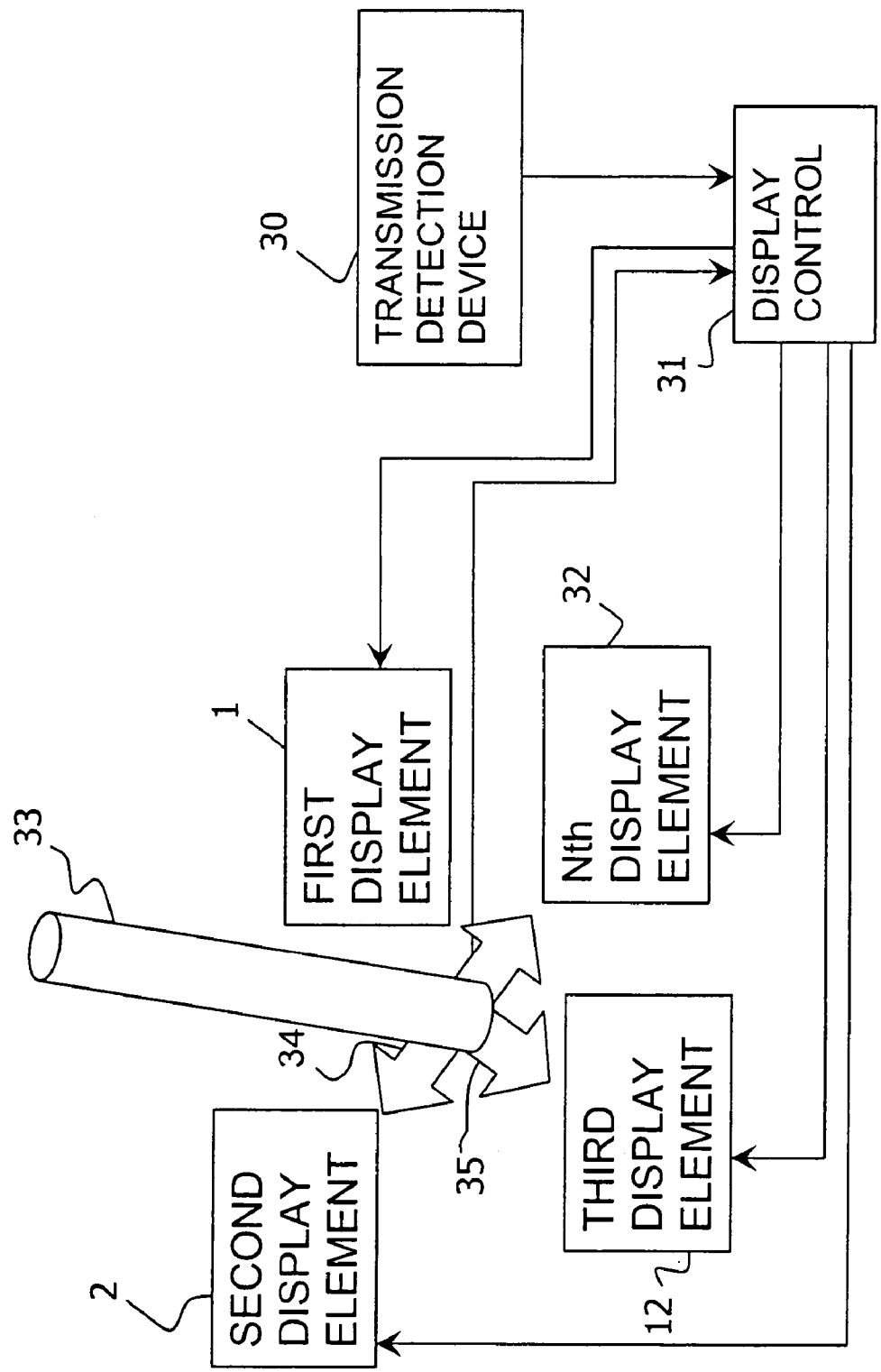
FIG. 10 is a schematic view showing the display device system.

FIG. 10 shows a schematic representation of the display device system. A transmission detection device 30 detects the transmission state (e.g., provides a signal representing the current shifting state). A display control 31 controls the first display element 1 such that the first display element 1 always displays the symbol associated with the current shifting state during the operation of the display device. The display control 31 controls the second display element 2 as well as display element 12 (a third display element) and further display elements 32. FIG. 10 also schematically shows the selection lever 33 moving in two shift gates 34 and 35. The shift information is provided to the display control 31.

While specific embodiments of the invention have been shown and described in detail to illustrate the application of the principles of the invention, it will be understood that the invention may be embodied otherwise without departing from such principles.

APPENDIX

| List of Reference Numbers: | |
|---|---|
| Display element: | 1, 2, 12, 14, 26, 27 |
| Arrow: | 3, 4, 9, 10, 11, 13, 15 |
| Stable selector lever position: | 5 |
| Unstable selector lever position: | 6, 7, 8, 17, 18, 20, 22, 23, 25 |
| Shift gate: | 16, 21, 24 |
| Selection gate: | 19 |
| Shift gate display: | 28, 29 |

What is claimed is:

1. A process for displaying symbols unambiguously associated with different shifting states of a motor vehicle transmission in at least two different display positions, the process comprising the steps:

shifting the motor vehicle transmission into a first shifting state by shifting a selector lever into a first selector lever position within a first shift gate, said first selector lever position being permanently associated with a first shifting state whereby the first shifting state becomes the current shifting state of the motor vehicle transmission;

displaying the symbol associated with the first shifting state, as the current shifting state, in a first of the two display positions;

displaying the symbol associated with a second of the shifting states in a second of the two display positions;

shifting of the motor vehicle transmission from the first shifting state into said second shifting state by shifting the selector lever into a second selector lever position within a second shift gate, said second selector lever position being permanently associated with said second shifting state whereby the second shifting state becomes the current shifting state of the motor vehicle transmission;

displaying the symbol associated with said second shifting state, as the current shifting state, in the first display position after the shifting and not displaying the symbol associated with said second shifting state in the second display position after said step of shifting, said first shift gate being parallel to said second shift gate, said first and said second shift gates being offset from one another in a direction perpendicular to a longitudinal direction of the shift gates.

2. A process in accordance with claim 1, wherein after displaying the symbol associated with said second shifting state, as the current shifting state shifting the motor vehicle transmission into the first shifting state by shifting the selector lever into the first selector lever position in the first shifting gate.

3. A process in accordance with claim 1, wherein both the symbol associated with the second of the shifting states and a shift gate display showing the direction of movement for shifting are displayed in the second of the two display positions.

4. An optical display device and selector lever arrangement comprising:
    shift gate means defining a first shift gate with a first shift lever position permanently associated with a first shift state of a motor vehicle transmission, a second shift gate with a second shift lever position permanently associated with a second shift state of the motor vehicle transmission and a stable position, said first shift gate being parallel to said second shift gate with said first shift gate and said second shift gate being offset from one another in a direction perpendicular to a longitudinal direction of the shift gates;
    a selector lever mounted in a motor vehicle for shifting from the stable position to the first shift lever position and from the stable position to the second shift lever position, the selector lever being pivoted along said shift gate means, said stable position being defined by a transverse shift gate, said first shift gate and said second shift gate being connected by said transverse shift gate;
    a first display element for displaying symbols unambiguously associated with the current shifting state;
    further display means for displaying information associated with one or more shifting states that are selectable shifting states from the current shifting state, said further display means being arranged in a different display position from said first display element;
    a display control for controlling said first display element such that said first display element always displays the symbol associated with the current shifting state of a shift lever position during the operation of the display device and such that said further display means only displays information associated with one or more shifting states that are selectable shifting states from the current shifting state.

5. A process for displaying symbols unambiguously associated with different shifting states of a motor vehicle transmission in at least two different display positions, the process comprising the steps:
    shifting the motor vehicle transmission into a first shifting state by shifting a selector lever into a first selector lever position permanently associated with a first shifting state whereby the first shifting state becomes the current shifting state of the motor vehicle transmission, said selector lever automatically returning to a stable selector lever position after shifting said selector lever into said first selector lever position;
    displaying the symbol associated with the first shifting state, as the current shifting state, in a first of the two display positions;
    displaying the symbol associated with a second of the shifting states in a second of the two display positions;
    shifting of the motor vehicle transmission from the first shifting state into said second shifting state by shifting the selector lever into a second selector lever position permanently associated with said second shifting state whereby the second shifting state becomes the current shifting state of the motor vehicle transmission, said selector lever automatically returning to the stable selector lever position after shifting said selector lever into said second selector lever position; and
    displaying the symbol associated with said second shifting state, as the current shifting state, in the first display position after the shifting and not displaying the symbol associated with said second shifting state in the second display position after said step of shifting, said first shift gate being parallel to said second shift gate, said first and said second shift gates being offset from one another in a direction perpendicular to a longitudinal direction of the shift gates.

6. A process for displaying symbols unambiguously associated with different shifting states of a motor vehicle transmission in at least two different display positions, the process comprising the steps:
    shifting the motor vehicle transmission into a first shifting state by shifting a selector lever into a first selector lever position permanently associated with a first shifting state whereby the first shifting state becomes the current shifting state of the motor vehicle transmission, said selector lever automatically returning to a stable selector lever position after shifting said selector lever into said first selector lever position, said stable selector lever position being located within a transverse shift gate;
    displaying the symbol associated with the first shifting state, as the current shifting state, in a first of the two display positions;
    displaying the symbol associated with a second of the shifting states in a second of the two display positions;
    shifting of the motor vehicle transmission from the first shifting state into said second shifting state by shifting the selector lever into a second selector lever position permanently associated with said second shifting state whereby the second shifting state becomes the current shifting state of the motor vehicle transmission, said selector lever automatically returning to the stable selector lever position after shifting said selector lever into said second selector lever position, said first and said second shift gate being connected by the transverse shift gate; and
    displaying the symbol associated with said second shifting state, as the current shifting state, in the first display position after the shifting and not displaying the symbol associated with said second shifting state in the second display position after said step of shifting, said first shift gate being parallel to said second shift gate, said first and said second shift gates being offset from one another in a direction perpendicular to a longitudinal direction of the shift gates.

7. An optical display device and selector lever arrangement comprising:
    shift gate means defining a first shift gate with a first shift lever position permanently associated with a first shift state of a motor vehicle transmission, a second shift gate with a second shift lever position permanently associated with a second shift state of the motor vehicle transmission and a stable position, said first shift gate being parallel to said second shift gate with said first shift gate and said second shift gate being offset from one another in a direction perpendicular to a longitudinal direction of the shift gates;

a selector lever mounted in a motor vehicle for shifting from the stable position to the first shift lever position and from the stable position to the second shift lever position, the selector lever being pivoted along said shift gate means, said stable position being defined by a transverse shift gate, said first shift gate and said second shift gate being connected by said transverse shift gate;

a first display element for displaying symbols unambiguously associated with the current shifting state;

further display means for displaying information associated with one or more shifting states that are selectable shifting states from the current shifting state, said further display means being arranged in a different display position from said first display element, said further display means comprising a first shift gate display associated with said first shift gate and a second shift gate display associated with said second shift gate, said first shift gate display and said second shift gate display being independently controlled; and a display control for controlling said first display element such that said first display element always displays the symbol associated with the current shifting state of a shift lever position during the operation of the display device and such that said further display means only displays information associated with one or more shifting states that are selectable shifting states from the current shifting state.

8. An optical display device and selector lever arrangement comprising:

shift gate means defining a first shift gate with a first shift lever position permanently associated with a first shift state of a motor vehicle transmission, a second shift gate with a second shift lever position permanently associated with a second shift state of the motor vehicle transmission and a stable position, said first shift gate being parallel to said second shift gate with said first shift gate and said second shift gate being offset from one another in a direction perpendicular to a longitudinal direction of the shift gates;

a selector lever mounted in a motor vehicle for shifting from the stable position to the first shift lever position and from the stable position to the second shift lever position, the selector lever being pivoted along said shift gate means, said stable position being defined by a transverse shift gate, said first shift gate and said second shift gate being connected by said transverse shift gate;

a first display element for displaying symbols unambiguously associated with the current shifting state;

further display means for displaying information associated with one or more shifting states that are selectable shifting states from the current shifting state, said further display means being arranged in a different display position from said first display element, said further display means comprising a first shift gate display associated with said first shift gate and a second shift gate display associated with said second shift gate, said first shift gate display and said second shift gate display being independently controlled, each of said first shift gate display and said second shift gate display being L-shaped, each with a shank; and a display control for controlling said first display element such that said first display element always displays the symbol associated with the current shifting state of a shift lever position during the operation of the display device and such that said further display means only displays information associated with one or more shifting states that are selectable shifting states from the current shifting state.

9. An optical display device and selector lever arrangement comprising:

shift gate means defining a first shift gate with a first shift lever position permanently associated with a first shift state of a motor vehicle transmission, a second shift gate with a second shift lever position permanently associated with a second shift state of the motor vehicle transmission and a stable position, said first shift gate being parallel to said second shift gate with said first shift gate and said second shift gate being offset from one another in a direction perpendicular to a longitudinal direction of the shift gates;

a selector lever mounted in a motor vehicle for shifting from the stable position to the first shift lever position and from the stable position to the second shift lever position, the selector lever being pivoted along said shift gate means, said stable position being defined by a transverse shift gate, said first shift gate and said second shift gate being connected by said transverse shift gate;

a first display element for displaying symbols unambiguously associated with the current shifting state;

further display means for displaying information associated with one or more shifting states that are selectable shifting states from the current shifting state, said further display means being arranged in a different display position from said first display element, said further display means comprising a first shift gate display associated with said first shift gate and a second shift gate display associated with said second shift gate, said first shift gate display and said second shift gate display being independently controlled, a symbol display element being arranged between a first shahk of said first shift gate display and a first shahk of said second shift gate display, another symbol display element being arranged as a part of a second shahk of said first shift gate display, a further symbol display element being arranged as a part of a second shahk of said first shift gate display; and a display control for controlling said first display element such that said first display element always displays the symbol associated with the current shifting state of a shift lever position during the operation of the display device and such that said further display means only displays information associated with one or more shifting states that are selectable shifting states from the current shifting state.

10. An optical display device and selector lever arrangement comprising:

shift gate means defining a first shift gate with a first shift lever position permanently associated with a first shift state of a motor vehicle transmission, a second shift gate with a second shift lever position permanently associated with a second shift state of the motor vehicle transmission and a stable position, said first shift gate being parallel to said second shift gate with said first shift gate and said second shift gate being offset from one another in a direction perpendicular to a longitudinal direction of the shift gates;

a selector lever mounted in a motor vehicle for shifting from the stable position to the first shift lever position and from the stable position to the second shift lever position, the selector lever being pivoted along said shift gate means, said stable position being defined by a transverse shift gate, said first shift gate and said second shift gate being connected by said transverse shift gate;

a first display element for displaying symbols unambiguously associated with the current shifting state;

further display means for displaying information associated with one or more shifting states that are selectable shifting states from the current shifting state, said further display means being arranged in a different display position from said first display element, said further display means comprising a first shift gate display associated with said first shift gate and a second shift gate display associated with said second shift gate, said first shift gate display and said second shift gate display being independently controlled, each of said first shift display and said second shift gate display having shahks such that the shahks of the first shift gate display are perpendicular to one another and shahks of the second shift gate display are perpendicular to one another; and a display control for controlling said first display element such that said first display element always displays the symbol associated with the current shifting state of a shift lever position during the operation of the display device and such that said further display means only displays information associated with one or more shifting states that are selectable shifting states from the current shifting state.

* * * * *